US010359984B2

(12) United States Patent
Ma et al.

(10) Patent No.: US 10,359,984 B2
(45) Date of Patent: Jul. 23, 2019

(54) IMAGE DISPLAY DEVICE AND IMAGE DISPLAY METHOD

(71) Applicant: BOE TECHNOLOGY GROUP CO., LTD., Beijing (CN)

(72) Inventors: Xitong Ma, Beijing (CN); Tianyue Zhao, Beijing (CN); Chuang Wei, Beijing (CN); Zhigang Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 54 days.

(21) Appl. No.: 15/508,262

(22) PCT Filed: Aug. 1, 2016

(86) PCT No.: PCT/CN2016/092701
§ 371 (c)(1),
(2) Date: Mar. 2, 2017

(87) PCT Pub. No.: WO2017/076077
PCT Pub. Date: May 11, 2017

(65) Prior Publication Data
US 2017/0286045 A1 Oct. 5, 2017

(30) Foreign Application Priority Data
Nov. 3, 2015 (CN) .......................... 2015 1 0738210

(51) Int. Cl.
*G06F 3/14* (2006.01)
*G09G 3/20* (2006.01)
(Continued)

(52) U.S. Cl.
CPC .......... *G06F 3/1446* (2013.01); *G09F 9/3026* (2013.01); *G09G 3/20* (2013.01);
(Continued)

(58) Field of Classification Search
None
See application file for complete search history.

(56) References Cited

U.S. PATENT DOCUMENTS 5,331,333 A * 7/1994 Tagawa ..................... G09F 9/33
345/31
5,900,909 A * 5/1999 Parulski ............... H04N 1/2112
348/231.6
(Continued)

FOREIGN PATENT DOCUMENTS

CN 1694059 A 11/2005
CN 102646009 A 8/2012
(Continued)

OTHER PUBLICATIONS

Chinese Office Action in 201510738210.5, dated Jul. 4, 2017.
International Search Report dated Nov. 4, 2016.
First Office Action dated Feb. 27, 2017.

*Primary Examiner* — Yi Wang
(74) *Attorney, Agent, or Firm* — Dilworth & Barrese, LLP; Michael J. Musella, Esq.

(57) ABSTRACT

An image display device and image display method. The image display device includes: a plurality of display screens spliced together, a corresponding gravity sensor integrated in each display screen, a logic circuit electrically connected with each display screen and each gravity sensor respectively, and a memory electrically connected with the logic circuit. The gravity sensor determines a placing direction of a corresponding display screen. The logic circuit automatically adjusts an access sequence of the image information in the memory according to the placing directions of the display screens determined by the gravity sensors, and outputs the accessed image information to the corresponding display screens, so that the image display device can nor-
(Continued)

mally display images when the display screens are placed right way up and/or placed up side down.

17 Claims, 4 Drawing Sheets

(51) Int. Cl.
G09F 9/302 (2006.01)
G09G 5/00 (2006.01)
G09G 5/12 (2006.01)
G09G 5/42 (2006.01)

(52) U.S. Cl.
CPC ........... *G09G 3/2096* (2013.01); *G09G 5/005* (2013.01); *G09G 5/12* (2013.01); *G09G 5/42* (2013.01); *G09G 2300/026* (2013.01); *G09G 2310/08* (2013.01); *G09G 2340/045* (2013.01); *G09G 2340/0407* (2013.01); *G09G 2340/0442* (2013.01); *G09G 2340/0492* (2013.01); *G09G 2370/12* (2013.01)

(56) References Cited

U.S. PATENT DOCUMENTS

| | | | |
|---|---|---|---|
| 2004/0164974 | A1 | 8/2004 | Son |
| 2013/0215104 | A1* | 8/2013 | Li ........................ H04N 13/398 345/419 |
| 2013/0222722 | A1* | 8/2013 | Zhao ........................ G09G 5/36 349/33 |
| 2013/0223764 | A1* | 8/2013 | Tripathi ................ G06T 3/4007 382/298 |
| 2016/0306436 | A1* | 10/2016 | Huang ................... G04C 3/002 |

FOREIGN PATENT DOCUMENTS

| | | |
|---|---|---|
| CN | 102831872 A | 12/2012 |
| CN | 203242247 U | 10/2013 |
| CN | 103745665 A | 4/2014 |
| CN | 104850384 A | 8/2015 |
| CN | 204719737 U | 10/2015 |
| CN | 105243966 A | 1/2016 |
| CN | 205069023 U | 3/2016 |
| JP | 2012203302 A | 10/2012 |

\* cited by examiner

IMAGE DISPLAY DEVICE AND IMAGE DISPLAY METHOD

TECHNICAL FIELD

Embodiments of the present disclosure relate to an image display device and an image display method.

BACKGROUND

Currently, in order to achieve large screen display, a display device formed by splicing a plurality of independent display screens may be adopted.

In a mounting process of a conventional display device formed by splicing a plurality of display screens, after the plurality of display screens are assembled, the display screens may be found out to be placed upside down, that is, a placing direction of the display screens can be rotated by 180 degrees. For instance, as illustrated in FIGS. 1A and 1B, the display device is formed by splicing four independent display screens ABCD together. The four display screens ABCD in FIG. 1A are all placed right way up. The display screens A and B in FIG. 1B are placed upside down, and the displays C and D in FIG. 1B are placed right way up. At this point, in order to ensure that the display device as shown in FIG. 1B can normally display images, the four display screens ABCD need to be reassembled, which is not only time-consuming but also is stressful. Moreover, as the width (as shown by "a" in FIGS. 1A and 1B) of an upper frame of the display is generally smaller than the width (as shown by "b" in FIGS. 1A and 1B) of a lower frame, in order to reduce the gap between the display screens so as to improve the display effect, the display screens A and B may need to be placed up side down in purpose as illustrated in FIG. 1B. In this case, the display device cannot normally display images.

SUMMARY

Embodiments of the present disclosure provide an image display device, comprising: a plurality of display screens spliced together, a corresponding gravity sensor integrated in each display screen, a logic circuit electrically connected with each display screen and each gravity sensor respectively, and a memory electrically connected with the logic circuit.

The memory is configured to store image information to be displayed;

The gravity sensor is configured to: determine a placing direction of a corresponding display screen; output a first control signal to the logic circuit when the placing direction of the corresponding display screen is determined to be a right-way-up direction; and output a second control signal to the logic circuit when the placing direction of the corresponding display screen is determined to be an upside-down direction.

The logic circuit is configured to: when receiving the first control signal, access corresponding image information in the memory according to a first sequence, and output the accessed corresponding image information to the corresponding display screen; and when receiving the second control signal, access corresponding image information in the memory according to a second sequence opposite to the first sequence, and output the accessed corresponding image information to the corresponding display screen.

Each display screen is configured to display an image according to the received corresponding image information.

Embodiments of the present disclosure further provide an image display method, comprising:

determining a placing direction of each display screen in a plurality of display screens spliced together;

for a first display screen with a placing direction determined to be a right-way-up direction, accessing first image information corresponding to the first display screen according to a first sequence;

for a second display screen with a placing direction determined to be a upside-down direction, accessing second image information corresponding to the second display screen according to a second sequence that is opposite to the first sequence;

outputting the accessed first image information to the corresponding first display screen, and outputting the accessed second image information to the corresponding second display screen; and performing image display according to the first image information and the second image information.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings without making other inventive work.

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

Embodiments of the present disclosure provide an image display device and an image display method, which are used for solving the problem that the display device cannot display normally as display screens are placed up side down. Detailed description will be given below to example implementations of the image display device and the image display method provided by the embodiments of the present disclosure with reference to the accompanying drawings.

Figure 1A:
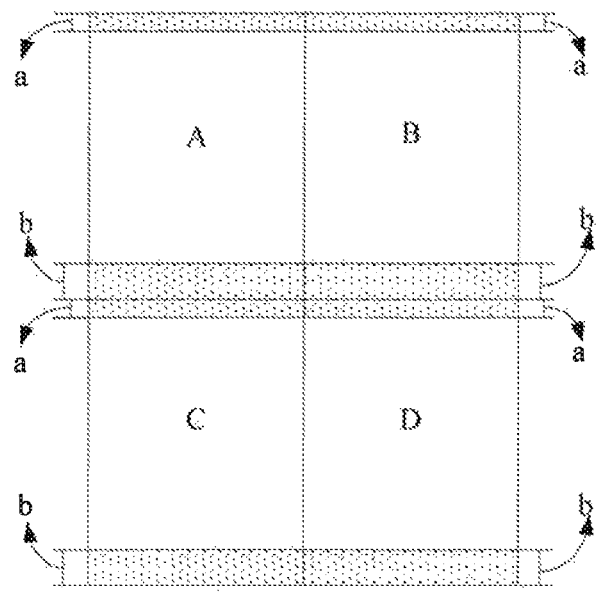
FIGS. 1A and 1B are respectively a schematic structural view of a conventional display device formed by splicing a plurality of display screens.
Figure 1B:
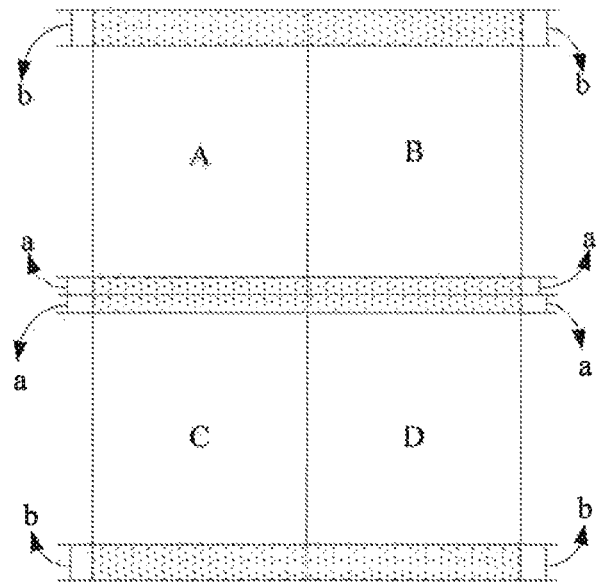
Figure 2:
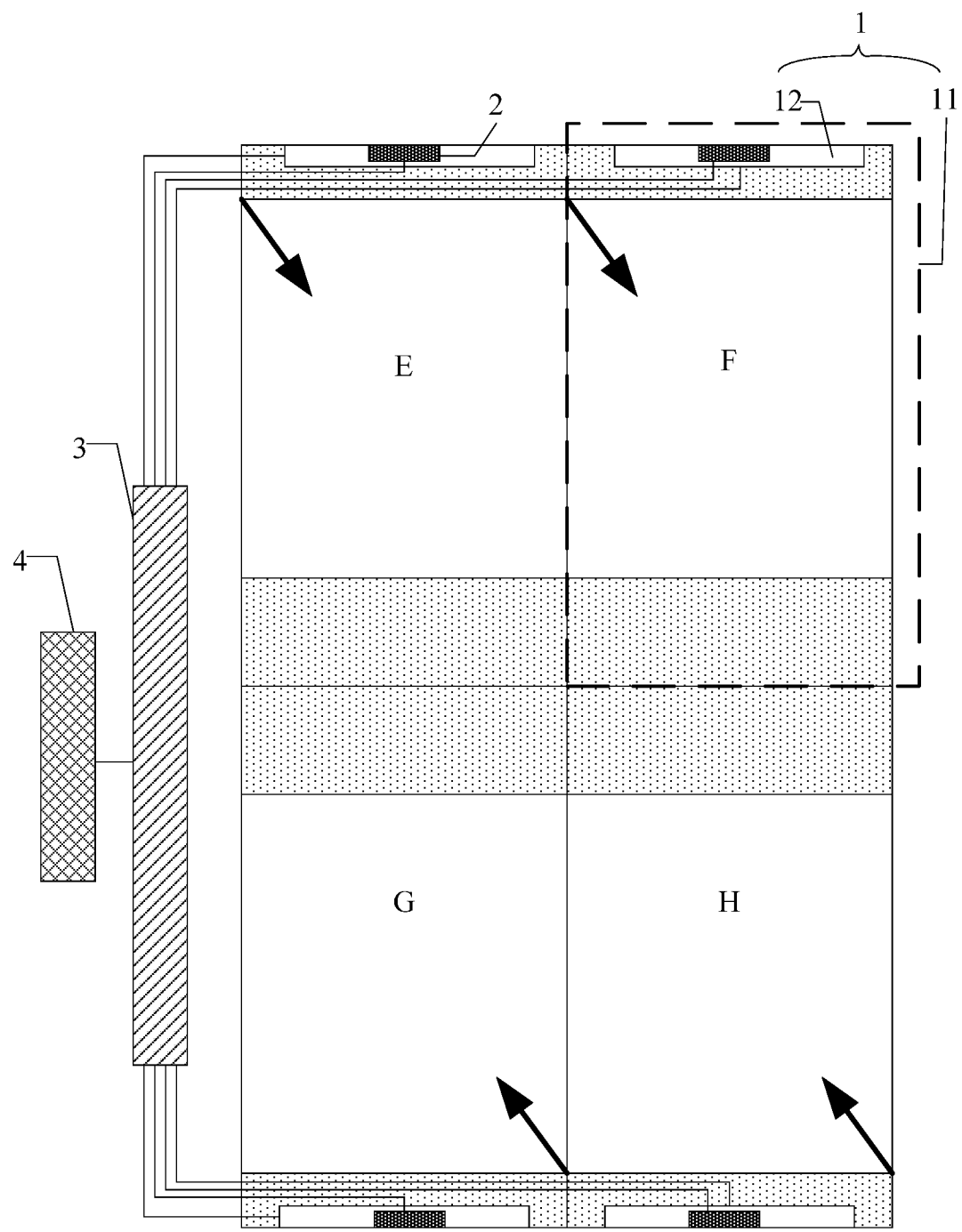
FIG. 2 is a schematic structural view of an image display device provided by an embodiment of the present disclosure.

An embodiment of the present disclosure provides an image display device, as shown in FIG. 2 which comprises: a plurality of display screens 1 spliced together, a respective gravity sensor 2 integrated in each display screen 1, a logic circuit 3 electrically connected with the display screens 1 and the gravity sensors 2 respectively, and a memory 4 electrically connected with the logic circuit 3.

The memory 4 is configured to store image information to be displayed.

Each gravity sensor 2 is configured to: determine a placing direction of a corresponding display screen 1; output a first control signal to the logic circuit 3 when the placing direction of the corresponding display screen 1 is determined to be in a right-way-up direction; and output a second control signal to the logic circuit 3 when the placing direction of the corresponding display screen 1 is determined to be in an upside-down direction.

The logic circuit 3 is configured to: when receiving the first control signal outputted by the gravity sensor 2, access corresponding image information in the memory 4 according to a first sequence, and output the accessed image information to a corresponding display screen 1; and when receiving the second control signal outputted by the gravity sensor 2, access corresponding image information in the memory 4 according to a second sequence opposite to the first sequence, and output the accessed image information to the corresponding display screen 1.

Each display screen 1 is configured to display an image according to the received corresponding image information.

In the image display device provided by the embodiments of the present disclosure, the gravity sensor determines a placing direction of a corresponding display screen, and the logic circuit automatically adjusts the access sequence of the image information in the memory according to the result of the placing direction of the display screen determined by the gravity sensor, and outputs the accessed image information to the corresponding display screen, so that the image display device can normally display images when the display screens are placed right way up and placed up side down.

In the image display device provided by an embodiment of the present disclosure as illustrated in FIG. 2, each display screen 1 may include a display panel 11 (a component as shown by dotted lines in FIG. 2) and a printed circuit board (PCB) 12 bonded with the display panel 11, where the display panel 11 may be a liquid crystal display (LCD) panel, an organic light-emitting diode (OLED) display panel, a plasma display panel (PDP) or other flat-panel display panels. No limitation will be given here. The specific structure of the PCB 12 is similar to the structure of a conventional PCB, and no further description will be given here. In some embodiments, as illustrated in FIG. 2, the gravity sensor 2 may be integrated in the PCB 12 in the corresponding display screen 1. Thus, the added gravity sensor 2 does not affect the aperture opening ratio of the display screen 1, and a power source can be conveniently supplied for the gravity sensor 2. For instance, as shown in FIG. 2, the PCB 12 may be bonded into an upper frame area of the display panel 11. Therefore, the gravity sensor 2 is also disposed in the upper frame area of the display panel 11. Of course, the PCB 12 may also be bonded into a lower frame area of the display panel 11. No limitation will be given here.

In the image display device provided by the embodiments of the present disclosure, the logic circuit 3 may be a field programmable gate array (FPGA) or other similar circuit devices. The logic circuit 3 is electrically connected with each display screen and may be electrically connected with the PCBs 12 through high definition multimedia interfaces (HDMI), so that the logic circuit 3 can output the accessed corresponding image information to the PCBs respectively, and the PCBs control corresponding display panels to display images to be displayed. For instance, an HDMI_TX element may be disposed in the logic circuit 3. The HDMI_TX element may be configured to output the image information to the PCBs in the format of HDMI.

Of course, in the image display device provided by the embodiments of the present disclosure, the logic circuit 3 may also be electrically connected with the PCBs by other approaches and output the image information to the PCBs in corresponding formats. No limitation will be given here.

It should be noted that in the image display device provided by the embodiments of the present disclosure, the logic circuit 3 is electrically connected with each gravity sensor 2. For instance, the logic circuit 3 may be electrically connected with the gravity sensors 2 through wires.

In the image display device provided by the embodiments of the present disclosure, the logic circuit 3 may include: a remote direct memory access (RDMA) component configured to access the image information in the memory. Thus, the image information in the memory may be accessed through the RDMA component in the logic circuit 3. Of course, other types of components may also be disposed in the logic circuit 3 to access the image information in the memory. No limitation will be given here.

In the image display device provided by the embodiments of the present disclosure, the memory 4 may, for instance, be a double data rate (DDR) SDRAM, or the memory 4 may also be other types of memories. No limitation will be given here.

In the image display device provided by the embodiments of the present disclosure, the gravity sensor 2 operates according to the principle of piezoelectric effect. For instance, piezoelectric effect refers to that: as for heteropolar crystals that do not have symmetrical centers, an external force applied to the crystals not only can result in the deformation of the crystals but also can change the polarized state of the crystals, so that an electric field can be formed in the crystals, and hence a voltage can be produced. The gravity sensor uses acceleration to cause the crystals to be deformed, and a voltage is produced by the crystal deformation; and hence the acceleration is converted into the output voltage. As the display screen has different accelerations under different placing states, the gravity sensor can produce different voltages due to the different accelerations. Therefore, a placing direction of the display screen may be determined by a voltage outputted by the gravity sensor. For instance, the first control signal may be a high level signal, and the second control signal may be a low level signal. That is, when the gravity sensor determines the placing direction of the display screen is the right-way-up direction, the high level signal is outputted to the logic circuit 3; and when the gravity sensor determines the placing direction of the display screen is the upside-down direction, the low level signal is outputted to the logic circuit 3. Alternatively, for instance, the first control signal may be a low level signal, and the second control signal may be a high level signal. No limitation will be given here in the present disclosure.

In the image display device provided by the embodiments of the present disclosure, the logic circuit is configured to: access corresponding image information in the memory row by row from top to bottom when receiving the first control signal outputted by the gravity sensor (that is, when the gravity sensor determines the placing direction of the display to be the right-way-up direction), where each row of image information is accessed one by one from left to right. For instance, display screens E and F as shown in FIG. 2 are placed right way up, and an order that the logic circuit accesses image information corresponding to the display screens E and F in the memory is from the top left of each display screen to the bottom right of the corresponding display screen (indicated by arrows on the upper part of FIG. 2). The logic circuit is also configured to: access corresponding image information in the memory row by row from bottom to top when receiving the second control signal outputted by the gravity sensor (that is, when the gravity sensor determines the placing direction of the display screen is the upside-down direction), where each row of image information is accessed one by one from right to left. For instance, display screens G and H as shown in FIG. 2 are placed up side down, and an order that the logic circuit accesses image information corresponding to the display screens G and H in the memory is from the bottom right of each display screen to the top left of the corresponding display screen (indicated by arrows on the lower part of FIG. 2).

Of course, in the image display device provided by the embodiments of the present disclosure, when receiving the first control signal outputted by the gravity sensor, the logic circuit may also access corresponding image information in the memory row by row from the bottom to the top, and each row of image information is accessed one by one from right to left; and when receiving the second control signal outputted by the gravity sensor, the logic circuit accesses the corresponding image information in the memory row by row from the top to bottom, and each row of image information is accessed one by one from left to right. Alternatively, when receiving the first control signal outputted by the gravity sensor, the logic circuit may access the corresponding image information in the memory from the top to bottom, and each row of image information is accessed one by one from right to left; and when receiving the second control signal outputted by the gravity sensor, the logic circuit accesses the corresponding image information in the memory from the bottom to the top, and each row of image information is accessed one by one from left to right. Alternatively, when receiving the first control signal outputted by the gravity sensor, the logic circuit may also access the corresponding image information in the memory from the bottom to the top, and each row of image information is accessed one by one from left to right; and when receiving the second control signal outputted by the gravity sensor, the logic circuit accesses the corresponding image information from the top to bottom, and each row of image information is accessed one by one from right to left. It is only needed to ensure that an access order of the corresponding image information when the placing direction of the display screen is the right-way-up direction is opposite to an access order of the corresponding image information when the placing direction of the display screen is in the upside-down direction. No limitation will be given to the access approach of the image information in the present disclosure.

In the image display device provided by the embodiments of the present disclosure, the logic circuit is also configured to perform synchronization, magnification and image quality adjustment on the accessed corresponding image information, and output the processed corresponding image information to the corresponding display screen. For instance, the logic circuit performs synchronous processing on the different image information corresponding to the different display screens, so that the display screens in the image display device can synchronously display the images. The logic circuit performs magnification processing on the image information corresponding to the display screens. For instance, the image information corresponding to the different display screens may be magnified to a needed resolution and a needed frame frequency. For instance, when the resolution of the image display device is 1920×1080 and the frame frequency is 60 Hz, the image information corresponding to the display screens may be magnified to 1920×1080@60 Hz. The logic circuit performs image quality adjustment on the image information corresponding to the display screens, so that the quality of the images displayed by the display screens in the image display device can be improved.

Figure 3:
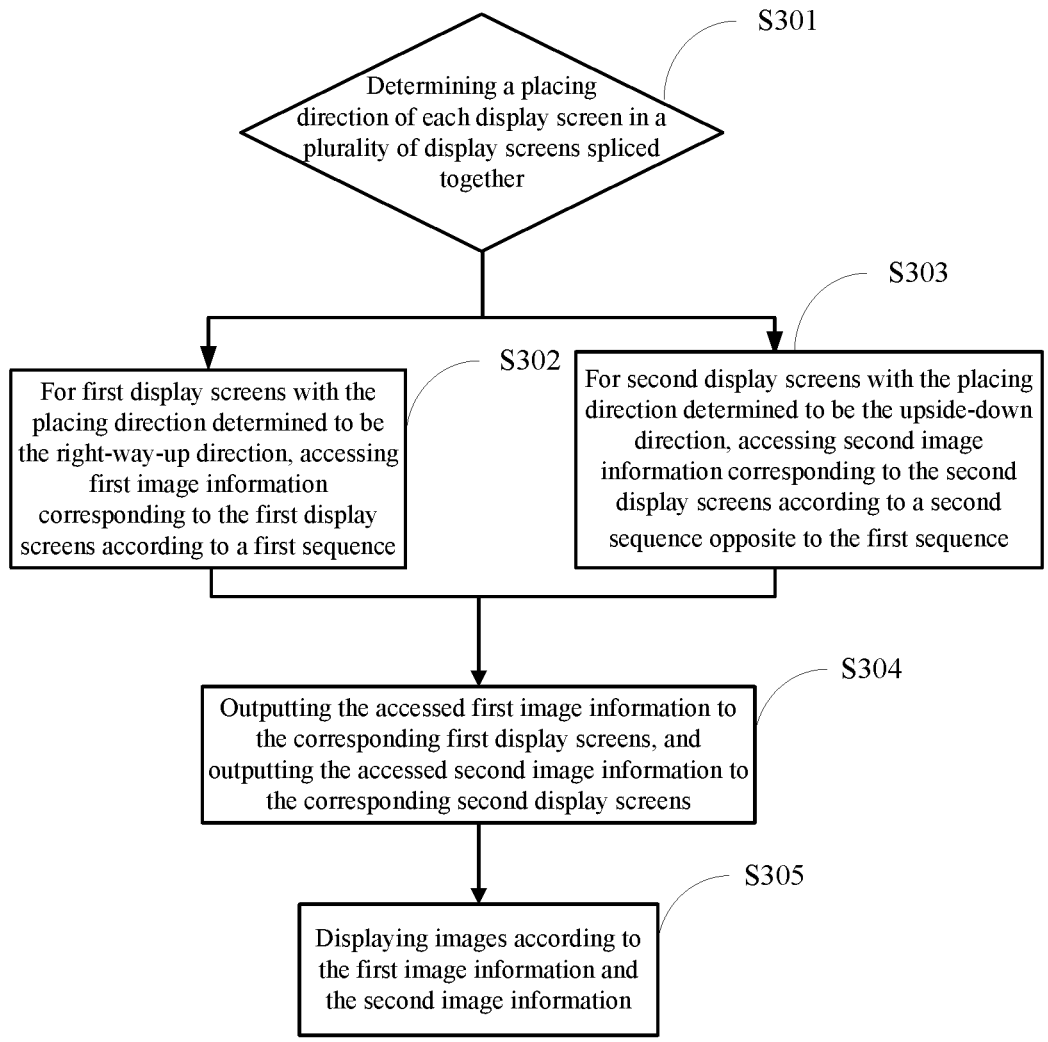
FIGS. 3 and 4 are respectively a flowchart of an image display method provided by embodiments of the present disclosure.

An embodiment of the present disclosure further provides an image display device, as shown in FIG. 3 which comprises the following steps:

S301: determining a placing direction of each display screen in a plurality of display screens spliced together (for instance, the plurality of display screens may include: one or more first display screens with a placing direction determined to be the right-way-up direction and/or one or more second display screens with a placing direction determined to be the upside-down direction); executing S302 for the first display screens with the placing direction determined to be the right-way-up direction; and executing S303 for the second display screens with the placing direction determined to be the upside-down direction;

S302: accessing first image information corresponding to the first display screens according to a first sequence;

S303: accessing second image information corresponding to the second display screens according to a second sequence that is opposite to the first sequence;

S304: outputting the accessed first image information to the corresponding first display screens, and outputting the accessed second image information to the corresponding second display screens; and S305: displaying images according to the first image information and the second image information.

Figure 4:
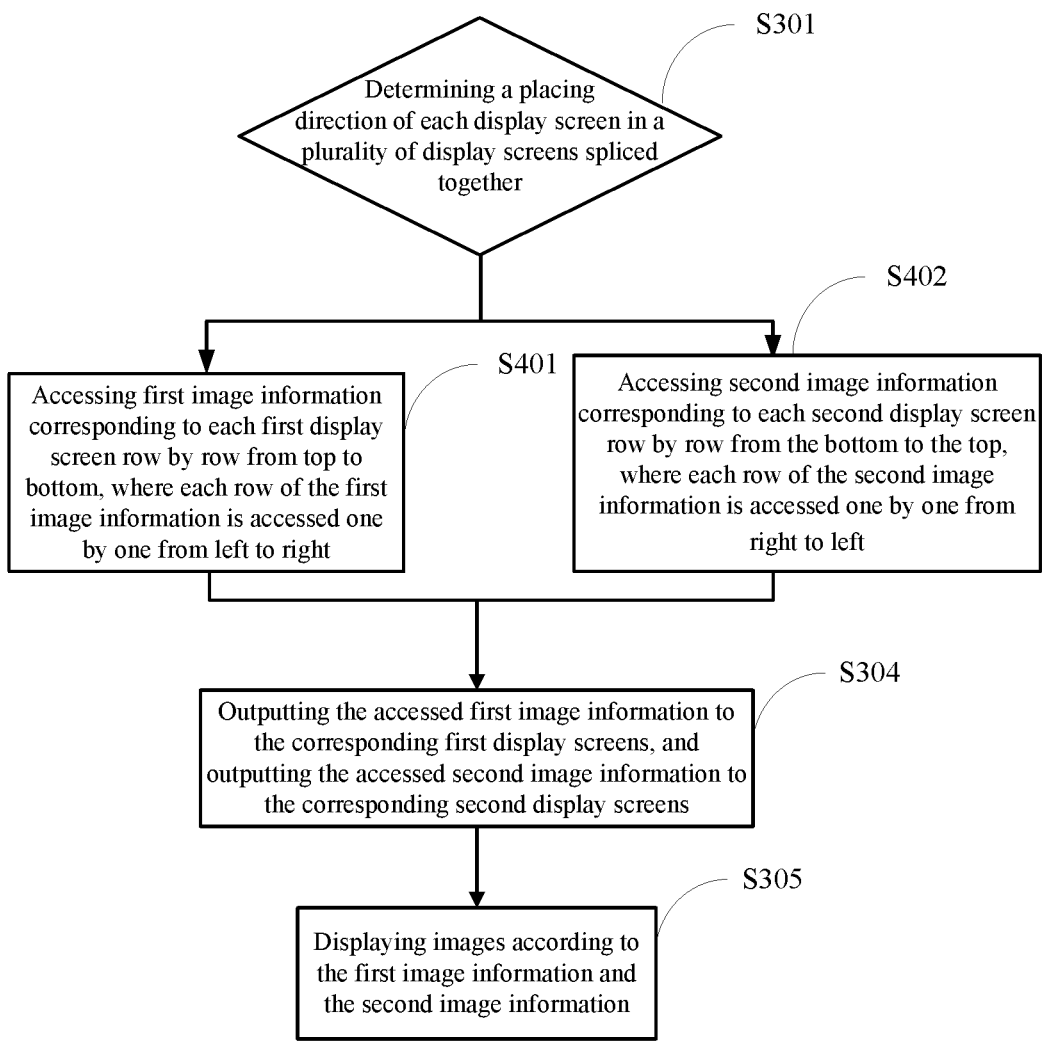

For instance, the process of accessing the first image information corresponding to the first display screens according to the first sequence in the step S302 of the image display method provided by the embodiments of the present disclosure includes the following step as shown in FIG. 4:

S401: accessing the first image information corresponding to each first display screen row by row from top to bottom, where each row of the first image information is accessed one by one from left to right.

As shown in FIG. 4, the process of accessing the second image information corresponding to the second display screens according to the second sequence that is opposite to the first sequence in the step S303 of the image display method provided by the embodiments of the present disclosure includes the following step:

S402: accessing the second image information corresponding to each second display screen row by row from the bottom to the top, where each row of the second image information is accessed one by one from right to left.

For instance, the process of outputting the accessed first image information to the corresponding first display screens and outputting the accessed second image information to the corresponding second display screens in the step S304 of the image display method provided by the embodiments of the present disclosure may be achieved by the following way:

performing synchronization, magnification and image quality adjustment on the accessed first image information, and outputting the processed first image information to the corresponding first display screens; and performing synchronization, magnification and image quality adjustment on the accessed second image information, and outputting the processed second image information to the corresponding second display screens.

Implementations of the image display method provided by the embodiments of the present disclosure may be achieved with reference to the embodiments of the image display device. No further description will be given here.

The embodiments of the present disclosure provide an image display device and an image display method. The image display device comprises: a plurality of display screens that are spliced together, a respective gravity sensor integrated in each display screen, a logic circuit electrically connected with each display screen and each gravity sensor respectively, and a memory electrically connected with the logic circuit. Each gravity sensor is configured to determine a placing direction of a corresponding display screen. The logic circuit is configured to automatically adjust the access sequence of corresponding image information in the memory according to the result of the placing direction of the corresponding display screen determined by the gravity sensor, and output the accessed image information to the corresponding display screen, so that the image display device can correctly display images when the display screens are placed right way up and/or placed up side down.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects.

Obviously, those skilled in the art may modify the disclosure in various ways without breaking away from the spirits and scope of the disclosure. And so, if these changes and variations of the disclosure also fall within the scope of the claims or their equivalent technologies, the disclosure intends to include these changes and variations.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present application claims the priority of the Chinese Patent Application No. 201510738210.5 filed on Nov. 3, 2015, which is incorporated herein by reference in its entirety as part of the disclosure of the present application.

What is claimed is:

1. An image display device, comprising: a plurality of display screens which are assembled in array so as to form the image display device, a corresponding gravity sensor integrated in each display screen, a logic circuit electrically connected with each display screen and each gravity sensor respectively, and a memory electrically connected with the logic circuit, wherein:
the memory is configured to store image information to be displayed;
the gravity sensor is configured to: determine a placing direction of a corresponding display screen; output a first control signal to the logic circuit when the placing direction of the corresponding display screen is determined to be a right-way-up direction; and output a second control signal to the logic circuit when the placing direction of the corresponding display screen is determined to be an upside-down direction;
the logic circuit is configured to: when receiving the first control signal, access corresponding image information in the memory according to a first sequence, and output the accessed corresponding image information to the corresponding display screen; and when receiving the second control signal, access corresponding image information in the memory according to a second sequence opposite to the first sequence, and output the accessed corresponding image information to the corresponding display screen; and
each display screen is configured to display an image according to the received corresponding image information;
wherein each display screen comprises a display panel and a printed circuit board (PCB) bonded with the display panel and the logic circuit is electrically connected with the PCB through a high definition multimedia interface (HDMI).

2. The image display device according to claim 1, wherein the gravity sensor is integrated in the PCB in the corresponding display screen.

3. The image display device according to claim 2, wherein the logic circuit is configured to:
access the corresponding image information in the memory row by row from top to bottom when receiving the first control signal, wherein each row of the corresponding image information is accessed one by one from left to right; and
access the corresponding image information in the memory row by row from bottom to top when receiving the second control signal, wherein each row of the corresponding image information is accessed one by one from right to left.

4. The image display device according to claim 2, wherein the logic circuit is configured to perform synchronization, magnification and image quality adjustment on the accessed corresponding image information, and output the processed image information to the corresponding display screen.

5. The image display device according to claim 1, wherein the logic circuit includes: a remote direct memory access (RDMA) component configured to access the image information in the memory.

6. The image display device according to claim 5, wherein the logic circuit is configured to:
access the corresponding image information in the memory row by row from top to bottom when receiving the first control signal, wherein each row of the corresponding image information is accessed one by one from left to right; and
access the corresponding image information in the memory row by row from bottom to top when receiving the second control signal, wherein each row of the corresponding image information is accessed one by one from right to left.

7. The image display device according to claim 1, wherein the memory is a double date rate synchronous dynamic random access memory (DDR SDRAM).

8. The image display device according to claim 1, wherein the first control signal is a high level signal; and
the second control signal is a low level signal.

9. The image display device according to claim 1, wherein the logic circuit is configured to:
access the corresponding image information in the memory row by row from top to bottom when receiving the first control signal, wherein each row of the corresponding image information is accessed one by one from left to right; and access the corresponding image information in the memory row by row from bottom to top when receiving the second control signal, wherein each row of the corresponding image information is accessed one by one from right to left.

10. The image display device according to claim 1, wherein the logic circuit is configured to perform synchronization, magnification and image quality adjustment on the accessed corresponding image information, and output the processed image information to the corresponding display screen.

11. An image display method for the image display device according to claim 1, comprising:
   determining a placing direction of each display screen among the plurality of display screens;
   for a first display screen with a placing direction determined to be a right-way-up direction, accessing first image information corresponding to the first display screen according to a first sequence;
   for a second display screen with a placing direction determined to be a upside-down direction, accessing second image information corresponding to the second display screen according to a second sequence that is opposite to the first sequence;
   outputting the accessed first image information to the corresponding first display screen, and outputting the accessed second image information to the corresponding second display screen; and
   performing image display according to the first image information and the second image information.

12. The image display method according to claim 11, wherein:
   for the first display screen with the placing direction determined to be the right-way-up direction, accessing the first image information corresponding to the first display screen according to the first sequence includes:
      accessing the corresponding first image information corresponding to the first display, screen row by row from top to bottom, wherein each row of the first image information is accessed one by one from left to right; and
   for the second display screen with the placing direction determined to be the upside-down direction, accessing the second image information corresponding to the second display screen according to the second sequence that is opposite to the first sequence, includes:
      accessing the corresponding second image information corresponding to the second display screen row by row from bottom to top, wherein each row of the second image information is accessed one by one from right to left.

13. The image display method according to claim 11, wherein outputting the accessed first image information to the corresponding first display screen and outputting the accessed second image information to the corresponding second display screen includes:
   performing synchronization, magnification and image quality adjustment on the accessed first image information, and outputting the processed first image information to the corresponding first display screen; and
   performing synchronization, magnification and image quality adjustment on the accessed second image information, and outputting the processed second image information to the corresponding second display screen.

14. The image display device according to claim 1, wherein the first control signal is a low level signal; and
   the second control signal is a high level signal.

15. The image display device according to claim 1, wherein the logic circuit is configured to:
   access the corresponding image information in the memory row by row from top to bottom when receiving the first control signal, wherein each row of the corresponding image information is accessed one by one from right to left; and
   access the corresponding image information in the memory row by row from bottom to top when receiving the second control signal, wherein each row of the corresponding image information is accessed one by one from left to right.

16. The image display device according to claim 1, wherein the logic circuit is configured to:
   access the corresponding image information in the memory row by row from bottom to top when receiving the first control signal, wherein each row of the corresponding image information is accessed one by one from right to left; and
   access the corresponding image information in the memory row by row from top to bottom when receiving the second control signal, wherein each row of the corresponding image information is accessed one by one from left to right.

17. The image display device according to claim 1, wherein the logic circuit is configured to:
   access the corresponding image information in the memory row by row from bottom to top when receiving the first control signal, wherein each row of the corresponding image information is accessed one by one from left to right; and
   access the corresponding image information in the memory row by row from top to bottom when receiving the second control signal, wherein each row of the corresponding image information is accessed one by one from right to left.

\* \* \* \* \*